United States Patent
Allman et al.

(10) Patent No.: US 6,355,320 B1
(45) Date of Patent: *Mar. 12, 2002

(54) SYNTHETIC CLOSURE AND MANUFACTURING PROCESS THEREOF

(75) Inventors: Michael Allman, Wilson; Eduardo Lauer, Zebulon, both of NC (US)

(73) Assignee: Nomacorc, LLC, Zebulon, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,728

(22) Filed: Oct. 1, 1999

Related U.S. Application Data

(60) Provisional application No. 60/105,073, filed on Oct. 21, 1998.

(51) Int. Cl.[7] .............................. B29D 22/00; B32B 3/26
(52) U.S. Cl. ................ 428/36.5; 428/304.4; 428/314.8; 428/317.9; 428/195; 215/355; 215/358; 215/364
(58) Field of Search .............................. 428/304.4, 36.5, 428/314.8, 317.9, 195; 215/355, 358, 364; 264/73, 74, 75

(56) References Cited

U.S. PATENT DOCUMENTS

| | | | | |
|---|---|---|---|---|
| 3,907,953 A | * | 9/1975 | Wheeler ..................... | 264/54 |
| 4,091,136 A | * | 5/1978 | O'Brien et al. ............. | 428/141 |
| 5,904,965 A | * | 5/1999 | Noel et al. ................. | 428/36.5 |
| 5,998,006 A | * | 12/1999 | Bambara et al. ......... | 428/304.4 |
| 6,085,923 A | * | 7/2000 | Yaniger ....................... | 215/355 |
| 6,153,275 A | * | 11/2000 | Yaniger ..................... | 428/34.4 |

* cited by examiner

Primary Examiner—Blaine Copenheaver
Assistant Examiner—Hai Vo
(74) Attorney, Agent, or Firm—Melvin I. Stoltz

(57) ABSTRACT

A plastic foamed synthetic closure for use with liquid bearing containers which closely simulates natural cork products is realized by incorporating color concentrates into the polymer melt and forming the color concentrates into elongated streaks. The desired emulation is further enhanced by arcuately pivoting the foamed plastic material during the production to form curved or sinusoidal-shaped streaks. This invention also provides manufacturing methods for mass producing individual products in a continuous motion casting system wherein fully complete products are formed in polymer casting members, which receive foam material exiting from the die and allow the foamed material to be formed in a continuous operation in the casting members. Finally, the present invention also teaches a unique system for maintaining and delivering carbon dioxide in its supercritical phase for use as a blowing agent.

17 Claims, 8 Drawing Sheets

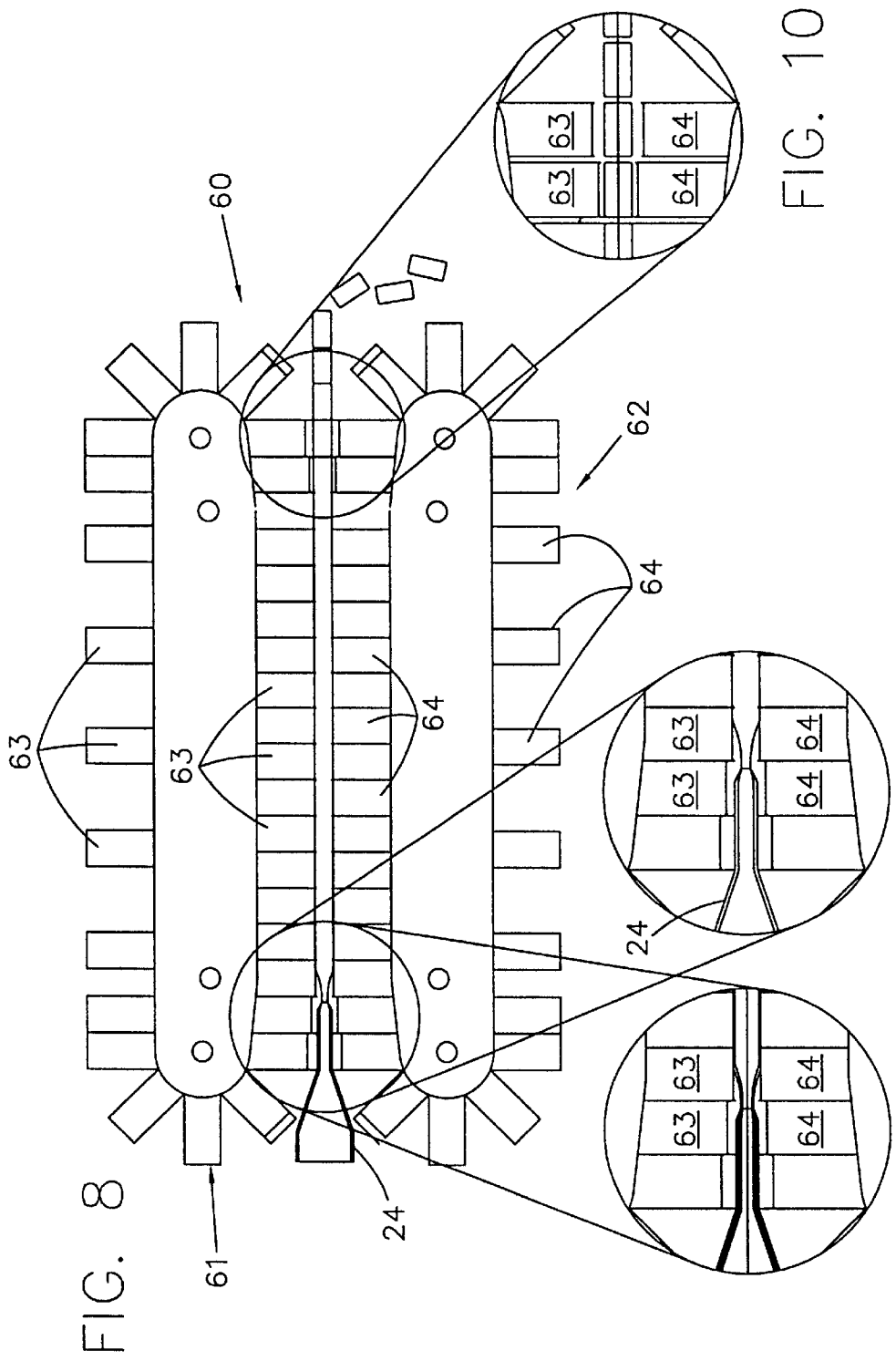

SYNTHETIC CLOSURE AND MANUFACTURING PROCESS THEREOF

This application claims benefit of Provisional Application Ser. No. 60/105,073 filed Oct. 21, 1998.

TECHNICAL FIELD

This invention relates to extruded elastomeric foams incorporating extremely fine, uniform cell structures, constructed for employment as a synthetic closure for liquid bearing vessels and, more particularly, to a process for producing such products as well as the product itself.

BACKGROUND OF THE INVENTION

For many years, the wine industry has relied on natural cork as the sole product to seal wine bottles. However, there are several negative aspects which are inherent in the use of natural cork as a closure, all of which are disturbing to the industry and to consumers.

One of the principal drawbacks of natural cork is cork taint. Cork taint exists because of a chemical compound (2,4,6-trichloranisole or TCA), which is found naturally in the cork bark. This taint effects the odor and flavor of the wine and accounts for as much as 50% of the spoilage of all wine bottled with natural cork.

Another problem is broad diversity that exists for natural cork quality. In an attempt to deal with this problem, the cork industry has adopted standards which are subjective at best and generally relate to the number of lenticels, cracks and their sizes, overall aesthetics, smells and functionality, all of which are subject to the growing and harvesting conditions experienced in the cork growing regions of the world. Each individual cork is therefore unique unto itself in all of its characteristics and possesses a wide range of variations. These variations may cause as much as 20% spoilage of bottled wine, due principally to such physical characteristics as non-circular cross-sections, cork size, density, and cell sizes internal to the natural cork that cannot be seen during manual grading. These uncontrollable variations often cause leakage and unwanted oxidation of the wine.

A further drawback of natural cork is the fact that cork is an extremely limited resource. Natural cork bark is harvested from the cork oak which is only able to replenish itself on the order of once every 10 years. This, coupled with the fact that new plantings require 30 years to come to maturity, leaves the natural cork industry with limited ability to increase productivity to meet the demand of an ever-increasing commodity.

A final drawback is the cost of natural cork. Due to its limited availability, especially for higher quality products, and increasing demand, the cost of using cork products in the wine industry has seen a constant rise over the years. This trend probably will not shift as it is a limited resource and is a very labor intensive industry.

In spite of these difficulties and drawbacks, a majority of all wine bottles utilize a natural cork for their closures. As a result, both the wine industry and the consumers have accepted cork closures and have tolerated a certain level of defective product. As a result, efforts to develop a synthetic closure acceptable to the wine industry and consumers have not materialized, except in the area of screw caps, made from aluminum and plastic, and a small segment of molded closures. However, in spite of the industry's desire to eliminate the inherent problems found with cork closures, prior to the present invention, no closure has been developed which is (1) able to maintain the ceremony of opening the wine bottle, (2) has none of the negative attributes of natural cork, (3) is aesthetically acceptable, (4) meets all the physical requirements of a high speed mass bottling, (5) is consistently reproducible, (6) meets all regulatory criteria, and (7) is cost effective in a mass production setting.

Therefore, it is a principal object of the present invention to provide closure means for containers which is manufacturable from synthetic materials and effectively closes and seals any desired bottle, container, package and the like.

Another object of the present invention is to provide a synthetic closure having the characteristic features described above which is manufacturable on a continuing production basis, thus providing lower manufacturing costs compared to natural closures and satisfying industry requirements for a removable bottle stopper which is producible substantially more economically than cork closure/stoppers.

Another object of the present invention is to provide a synthetic closure having the characteristic features described above which meets or exceeds all of the requisite physical characteristics found in natural closures or stoppers such as cork.

A further object of the present invention is to provide a synthetic closure or stopper having the characteristic features described above which is capable of simulating all of the visually aesthetic and tactile characteristics found in natural stoppers, such as cork, so as to be effectively a substitute for cork stoppers or closures for the wine industry, particularly its ends users in both appearance and feel.

Another object of the present invention is to provide a synthetic closure or stopper having the characteristic features described above which is capable of being employed in conventional bottling equipment for being inserted into a bottle container without experiencing any unwanted physical damage.

Another object of the present invention is to provide a synthetic closure or stopper having the characteristic features described above that can be substituted for a cork stopper in wine bottles, providing all of the desirable characteristics of conventional cork stoppers while also being removable from the bottle in the conventional manner without breaking.

Another object of the present invention is to provide a synthetic closure or stopper having the characteristic features described above, which is physiologically neutral, capable of being sterilized, as well as capable of being formed to visually simulate any desired classification of natural cork.

A further object of the present invention is to provide a synthetic closure or stopper having the characteristic features described above which is odorless, remains odorless in position, is tasteless, and only absorbs limited amounts of water.

Another object of the present invention is to provide a synthetic closure or stopper having the characteristic features described above which is unaffected by diluted acids and bases as well as unaffected by most oils.

Another object of the present invention is to provide a synthetic closure or stopper having the characteristic features described above which does not shrink, does not age, does not absorb mold or fungus, and resists damage from insects.

Another object of the present invention is to provide a synthetic closure or stopper having the characteristic features described above which can be mass produced on a continuing basis and eliminates any spoilage of wine due to cork taint.

Other and more specific objects will in part be obvious and will in part appear hereinafter.

SUMMARY OF THE INVENTION

By employing the present invention, all of the difficulties and drawbacks found in the prior art have been eliminated and an extruded synthetic closure capable of being manufactured continuously and providing a low cost product is achieved. In addition, the synthetic closure of the present invention possesses all of the physical and desirable visual characteristics required by the wine industry. As a result, the present invention achieves a synthetic closure usable in the wine industry as a bottle closure which is virtually equivalent in all respects to a natural cork closure.

One of the principal requirements imposed upon a closure for wine bottles is its sealing capability. In the wine industry, high speed corking machines are employed which subject the closures to extreme forces. These corking machines typically utilize a plurality of compression jaws, typically ranging between two and four, which radially compress the closure from its normal diameter to a substantially smaller diameter, which is about one third of its original size. Then, by employing a plunger or ram, the closure is forced from the jaws in the compressed mode directly into the neck of the bottle, wherein the closure is able to expand to its original diameter, sealing the bottle.

As a result of the construction of the compression jaws, a knife edge is created on each jaw member. Consequently, between two and four separate locations incorporate an inherent knife edge formed on the jaw element. These knife edges often crease or score the outer surface of the closure, unless the closure is sufficiently elastic in nature to be able to resist this scoring or creasing action. In many instances, creasing or scoring of the closure causes the bottle of wine to leak or allows the transfer of the outside atmosphere into the bottle, causing oxidation of the wine and rendering the wine unpalatable.

In the present invention, the formulation employed for attaining a synthetic closure achieves a resulting product which is capable of resisting the compressive forces imposed on the closure by the corking jaws, as well as resisting any permanent scoring or creasing of the outer surface. In addition, the synthetic closures of the present invention also possess a high compression recovery rate, enabling the synthetic closure of the present invention to return to at least 96% of its original diameter upon exiting the jaws of the corking machines. In this way, the synthetic closure of the present invention is capable of providing all of the desired attributes for attaining a viable closure for the wine industry, enabling the closure to be employed in normal production equipment for completely sealing the wine bottle upon insertion therein.

Another feature of the present invention is the ability to attain a synthetic closure which is capable of receiving and cooperating with any desired surface treatment. In this way, the extraction forces required to remove the synthetic closure of the present invention from a wine bottle is easily controlled.

Extraction force is typically defined as the force a person of ordinary strength must exert to remove the closure from the one bottle without undue stress or strain. Typically, between about 40 pounds and 80 pounds of pulling force is required. In the present invention, the synthetic closure defined herein is capable of easily meeting this standard, due to the compatibility of the formulation of the present invention with conventional surface treatments. In addition, this compatibility also enables the closure of the present invention to incorporate any other treatment typically required for controlling insertion depth.

Another feature of the present invention is the attainment of a synthetic closure which has a neutral smell or aroma and does not impart any objectionable fragrance, smell or aroma to the wine itself. In this way, the normal wine fragrance is not disturbed and the flavor sensation associated with a particular vintage or type of wine is not negatively impacted. Furthermore, the present invention does not impact unwanted flavors to the wine, allowing the wine to remain with all of its natural flavor.

In addition to attaining all of these physical attributes, the formulation of the synthetic closure of the present invention also needs or exceeds all requirements of the Food, Drug and Cosmetic Act, enabling the closure to be used in direct contact with food products. Furthermore, in accordance with the present invention, unique color concentrates are capable of being integrated into the formulation. In this way, the synthetic closure of the present invention may be formulated with a visual appearance virtually identical to natural cork. In this regard, the growth rings typically associated with natural cork are able to be emulated by the synthetic closure of the present invention. Furthermore, if desired, any coloring can be imparted into the synthetic closure to provide a unique visually distinctive product, as well as provide a surface upon which any printed indicia, such as logos, dates, characters, etc. can be applied to the surface of the synthetic closure.

The invention accordingly comprises an article of manufacture possessing the features, properties, and relation of elements which will be exemplified in the article hereinafter described, as well as the several steps in relationship of one of more steps with respect to each of the other and producing the article of manufacture defined herein, with the scope of the invention being indicated in the claims.

THE DRAWINGS

For a fuller understanding of the nature and object of the invention, reference should be had to the following detailed description taken in connection with the accompanying drawings, in which:

FIG. 8 is a diagrammatic top plan view of a continuous motion casting system of the present invention for use in mass producing completely finalized finished products;

FIG. 9 is a greatly enlarged top plan view of the polymer receiving zone of the continuous motion casting system of FIG. 8;

FIG. 10 is a greatly enlarged top plan view of the product discharge zone of the continuous motion casting system of FIG. 8;

FIG. 11 is a greatly enlarged top plan view of the polymer receiving zone of the continuous motion casting system of FIG. 8 wherein a coextrusion die is employed;

DESCRIPTION OF THE INVENTION

Figure 1:
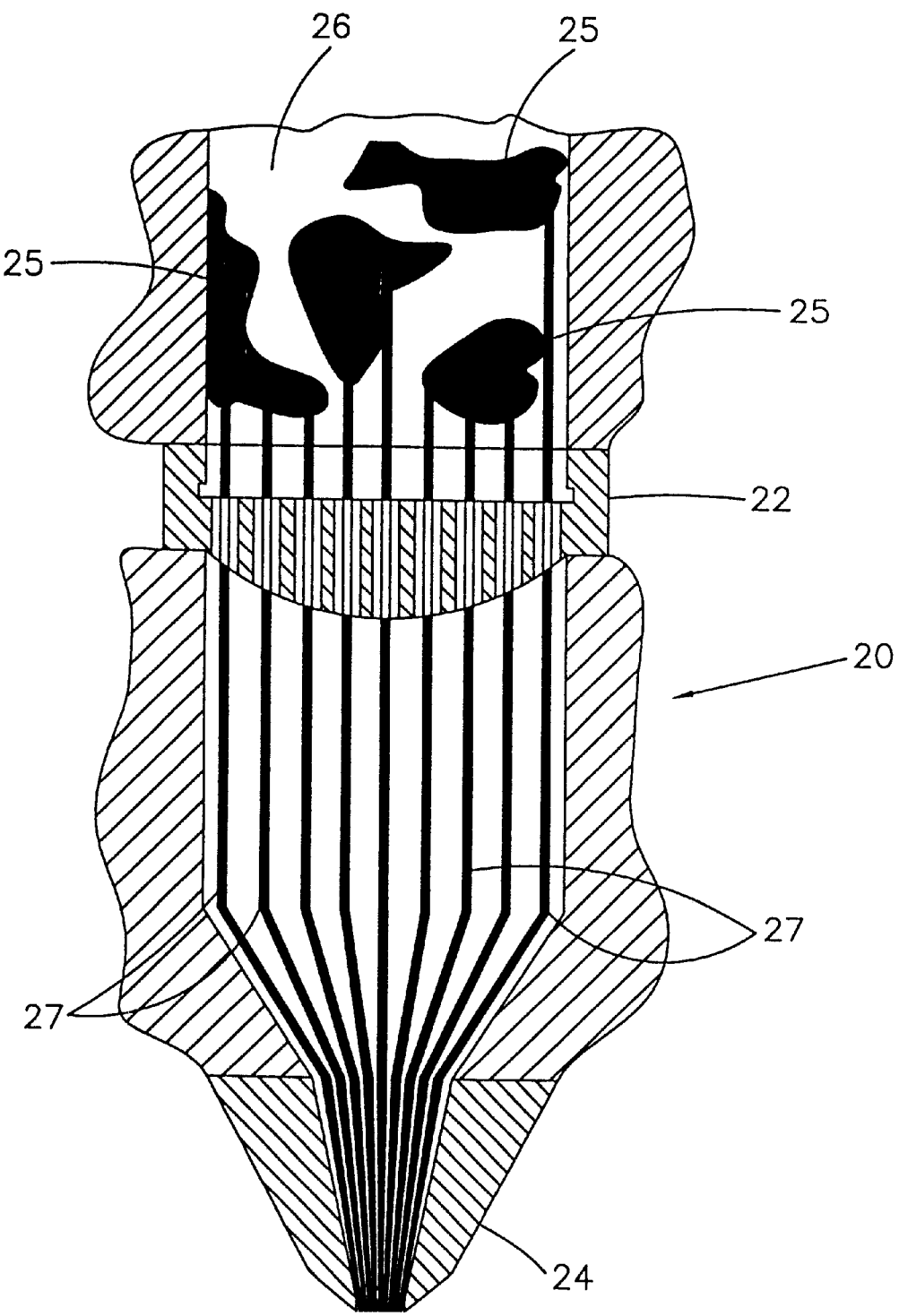
FIG. 1 is a cross-sectional side elevational view of a portion of the linear flow extrusion device employed in the present invention.

By employing the present invention, all of the drawbacks and difficulties of the prior art are overcome and an extruded, medium to high density, uniform, extremely fine cell elastomeric, synthetic foam closure is achieved. In accordance with this invention, a unique formulation and extrusion process is provided which completely overcomes the inefficiencies of prior art attempts to achieve a synthetic closure acceptable to both the industry and consumers. By employing the teachings of the present invention, the physical and visual attributes of natural cork are provided without the negative aspects of natural cork products.

In order to achieve the advancement attained by the present invention, a unique formulation is employed. By employing the present invention, an extruded, uniform, extremely fine cell, elastomeric foam closure is attained having a medium to high density of between about 100 and 500 kg/m$^3$. In order to attain this result, the elastomeric foam closure comprises a blend of plastic polymers, additives, color concentrates, and a combination of physical and chemical blowing agents to produce a medium or low density closed cell foam rod with all of the desired physical and aesthetic attributes.

In the present invention, the preferred polymers are selected from one or more groups of materials compatible with one another and meeting FDA guidelines for direct food contact. These groups include homopolymers, copolymers (including random copolymers, alternating copolymers, block copolymers or grafted copolymers), terpolymers, interpolymers, as well as a group of compounds known to those skilled in the art as thermoplastic elastomers (TPE's) and thermoplastic olefins (TPO's). These thermoplastics include polyurethanes, elastomeric alloys, thermoplastic copolyesters, styrene block copolymers (such as SEBS, SBS, styrene isoprene) and thermoplastic amides.

The preferred combination of the present invention comprises a polyethylene homopolymer, polyolefin elastomer and an ionically cross-linked resin. It has been found that this blend, either independently or in combination with all of the other components or formulations of this invention, yields a foam structure capable of meeting the demands of the wine industry.

One of the principal requirements that must be met by a synthetic wine closure is the elastic recovery characteristics which will enable the synthetic closure to withstand creasing and scoring from the jaws of the high speed corking apparatus used in the wine industry for mass bottling. In order to attain a high quality synthetic closure in accordance with the present invention, the preferred formulation comprises one or more homopolymers ranging between about 10% and 60% of the entire composition. More preferably, it has been found that the homopolymers should comprise between about 20% and 40%, with 30% being optimum. Generally, the percentage of thermoplastic elastomer employed in the composition ranges between about 10% and 60%, preferably between about 20% and 40%, with 30% being optimum. Finally, the percentage of the ionically cross-linked resin ranges between about 10% and 60%, preferably between 20% and 40%, with 30% being optimum.

In accordance with the present invention, a synthetic bottle closure is attained which possesses all of the physical characteristics to enable the synthetic closure to be virtually equivalent to the desirable characteristics of natural cork. In addition, in order to provide a further enhancement to the present invention, the preferred embodiment is constructed in a manner which visually simulates the appearance of cork. As one aspect of this construction, color concentrates are incorporated into the synthetic cork formulation in a manner which emulates the visual appearance produced by the "growth rings" typically found in cork closures.

Preferably, the color concentrate utilized to obtain the desired "growth ring effect" is a combination of two distinctly different hues with each of these hues being achieved by using different viscosity polymers as part of a pigmenting system which is compatible with the other components of the synthetic closure. For example, light brown and dark brown pigmenting polymers can be employed, with the light brown polymers having a melt flow index of between about 6 and 10, while the dark brown polymer have a melt flow index of between about 16 and 20. This disparity in melt flow indices and, hence the viscosity of the polymers, produces a mottling effect within the extruder.

As shown in FIGS. 1–5, the system of the present invention employs die head 20 which comprises linear flow extrusion device 22 and die 24. In addition, linear flow extrusion device 22 comprises apertures or passageways 23 formed therein for controlling the flow of the polymer melt therethrough.

As diagrammatically depicted in these figures, color concentrates 25 are incorporated into the plastic melt 26. Mottling characteristics produced by the pigmented polymers or concentrates 25 are transformed into random linear stripings or strips 27, which may have different widths as the color concentrates 25 and polymer melt 26 pass through apertures 23 of linear flow extrusion device 22. By employing this construction, the growth rings of the natural cork product are simulated.

In addition, as is more fully detailed below, the preferred process of the present invention utilizes oscillating motion on the downstream portion of the extrusion to continuously manipulate the extruded foam rod in a slight back and forth motion, producing slight "wiggles" or interruptions in the linearity of the streaks. In this way, the "growth ring effect" is further emulated and enhanced.

Other components incorporated into the composition of the present invention comprises one or more suitable and compatible nucleation agents.

Preferably, the nucleating agent is selected from the group consisting of titanium oxide, silica, talc, calcium silicate, barium sulfate, and diamatious earth. Although these compounds are preferred, other agents known to those skilled in this art may also be used.

Generally, the nucleating agent comprises between about 1% and 10% by weight of the weight of the entire composition and, typically, between about 2% and 8% by weight of the entire composition. In addition, it has been found that 5% of the composition is preferred.

Furthermore, a chemical blowing agent is also preferably employed in the formulation of the foamed rod of the present invention. Preferably, an endothermic alkali carbonate mixture is employed which provides a multifunctional purpose as the chemical makeup and particle size is advantageous in nucleating the foam even beyond the capability of the nucleating agent. This intense nucleation yields extremely fine cell size in combination with the extreme atomization achieved by also employing a physical blowing agent. Generally, the chemical blowing agent comprises between about 0.5% and 5% by weight of the weight of the entire composition, with between 1% and 30% being typically employed. However, in the preferred composition, about 2% by weight is employed.

As mentioned above, a physical blowing agent is preferably employed in addition to the chemical blowing agent. It has been found that an effective physical blowing agent may be selected from the group consisting of aliphatic hydrocarbons and inorganic blowing agents. In regard to the use of aliphatic hydrocarbons as the physical blowing agent, it is preferred to employ one or more agents selected from the group consisting of methane, ethane, propane, n-butane, isobutane, n-pentane, isopentane and neopentane. In addition, the preferred inorganic blowing agent preferably comprises one or more agents selected from the group consisting of carbon dioxide, nitrogen, water, air, helium, and argon. The most suitable of these blowing agents is liquid carbon dioxide in its supercritical phase.

Generally, the physical blowing agent incorporated into the polymer melt ranges between about 0.01% and 3% by weight based upon the weight of the entire composition. In addition, it has been found that between about 0.05% and 2% by weight is effective, with between about 0.1% and 1% being preferred. These percentages will generally produce densities, of the final extruded, extremely fine cell elastomeric foam suitable for a synthetic wine closure on the order of 100 to 500 $kg/m^3$, typically on the order of between 150 to 300 $kg/m^3$.

In addition to the blowing agents detailed above, other blowing agents that may be employed comprise one or more selected from the group consisting of nitrogen, carbon, water, air nitrogen, helium, and argon, Azodicarbonamic Azodiisobutyro-Nitride, Benzenesulfonhydrazide, 4,4-Oxybenzene Sulfonylsemicarbazide, p-Toluene Sulfonylsemi-carbazide, Barium Azodicarboxlyate, N,N'-Dimethyl-N,N'-Dinitrosoterephthalamide, Trihydrazinotriazine, Aliphatic Hydrocarbons having 1–9 carbon atoms, Halogenated Aliphatic Hydrocarbons having 1–9 carbon atoms, Aliphatic Hydrocarbons having 1–9 carbon atoms, Aliphatic alcohols having 1–3 carbon atoms and partially Hydrogenated Chlorocarbon and Chlorofluorocarbons.

The Process

The conventional technique of foaming is well known to those skilled in the art. However, one aspect of the present invention comprises a novel process which has been developed in order to achieve the desired final product on a consistent, repeatable production basis. In carrying out the process of the present invention, an extruder is employed which comprises a tandem single screw construction, typically a conventional single screw extruded. However, preferably, a counter-rotating twin screw extruder is employed utilizing screw designs that produce a high degree of plastification in the first stage, without adding excess shear and temperature into the melt.

In accordance with the present invention, the physical blowing agent is injected between the first and second stage. In addition, the second stage includes an aggressive dispersive as well as distributive mixing section which achieves the proper solubility of carbon dioxide in its supercritical phase within the polymer melt, while maintaining the pressure requirements of carbon dioxide in its supercritical phase.

Figure 6:
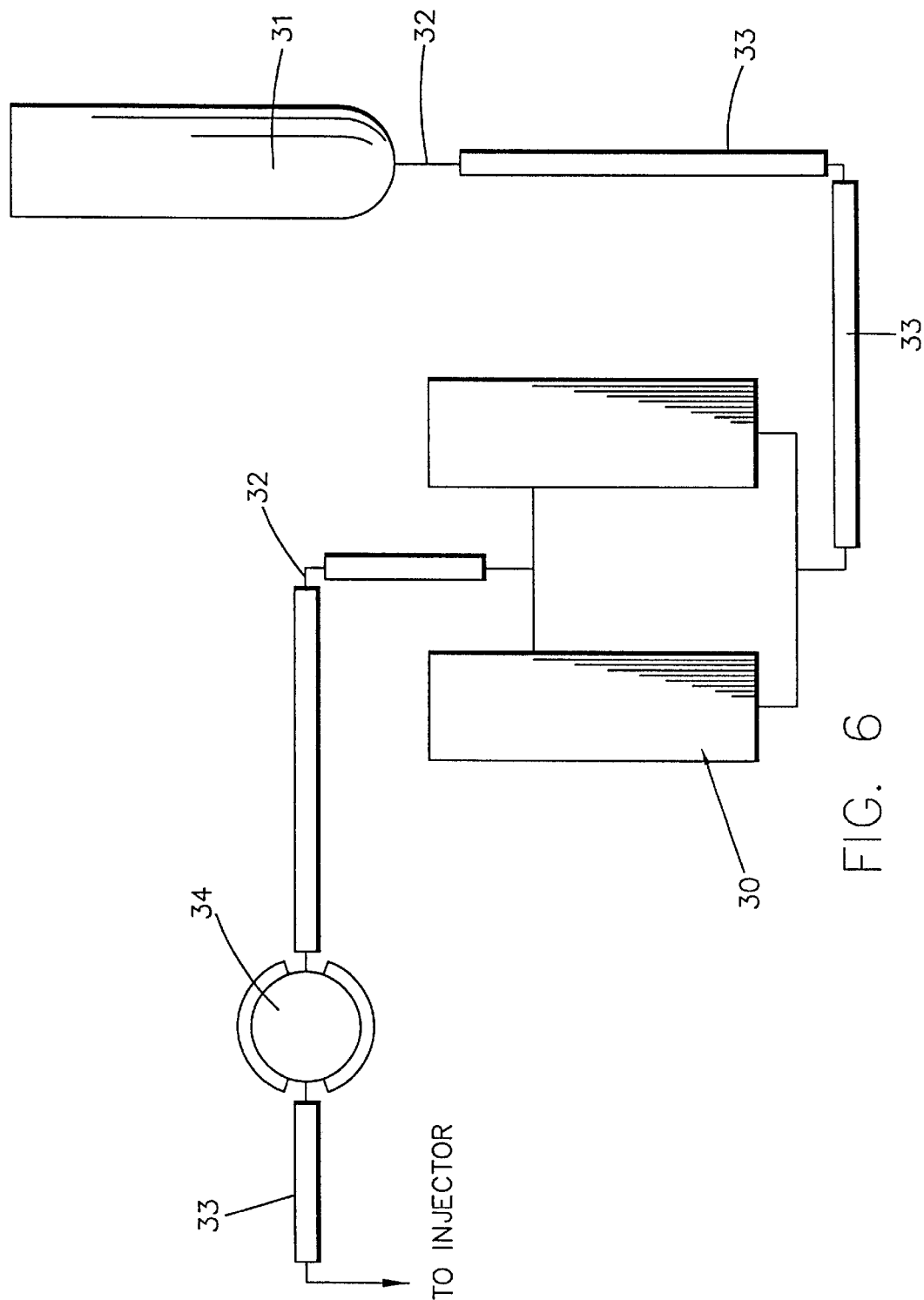
FIG. 6 is a diagrammatic view of a pumping system preferably employed for delivering the blowing agent to the desired location in the present invention.

Injecting carbon dioxide as a blowing agent requires a novel pumping system to accurately and consistently deliver carbon dioxide to the injector in its supercritical phase. In the preferred embodiment, as diagrammitcally depicted in FIG. 6, the delivery system comprises a dual cylinder syringe type pump 30 which incorporates a water cooled jacket. In addition, the carbon dioxide is stored as a liquid in tank 31 and delivered to pump system 30 through tubing 32, all of which are surrounded by water cooled jackets 33.

In the preferred construction, pump system 30 is retrofitted with a mass flow meter coupled to a feedback loop with appropriate computer controls to maintain the flow volume to within 0.1 ml/hr. The carbon dioxide flow from pump system 30 is carried in tubing 31, to a pre-pressure regulator 34, and then delivered to the injectors of the extruder. All tubing 31 used to carry this carbon dioxide is preferably surrounded by water cooled jackets 33. In this way, constant pressure above the pre-pressure set point of 2600 psi is maintained.

In this embodiment, pre-pressure is regulated through a diaphragm type valve with a variable set point. This regulator is constructed so as to move a specific volume of carbon dioxide without the loss of pressure on the outlet side. All components of the pumping station utilize a novel cooling system which maintains carbon dioxide at a temperature well below its critical temperature. This construction allows for both the refilling and the pumping of carbon dioxide at a known density and volume, with repeatability when switching between pumping cylinders. The cooling medium employed preferably comprises chilled water circulating at a constant 20° C., which maintains the carbon dioxide at 25° C. Therefore, by maintaining a pressure of 2500 psi at 25°, a constant density of 0.906 gram/ml is achieved as well as maintaining the carbon dioxide in its liquid phase.

In order to increase the solubility of the carbon dioxide Within the polymer composition and achieve a resulting product having much finer cell structure than can be achieved with conventional foaming techniques, the temperature and pressure of the carbon dioxide must be held well above its critical points at the injector. In accordance with the present invention, the result is attained by employing a uniquely constructed injector depicted in FIG. 7.

Figure 7:
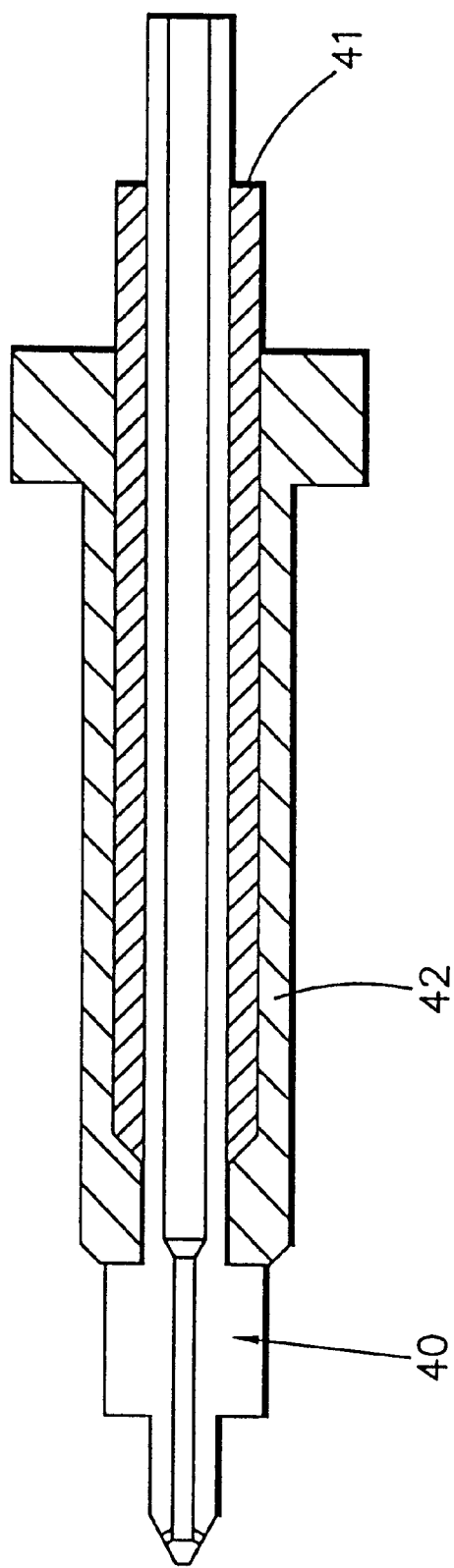
FIG. 7 is a cross-sectional side elevation view depicting the preferred construction of the blowing agent injector.

As shown in FIG. 7, injector 40 is insulated with a fiber reinforced phenolic sleeve 41 which preferably extends between about 60% and 100% of the injector length, from the barrel (heat source) to the injection point. Preferably, injector 40 is held in place by retaining bolt or collar 42. It has been found that the construction of injector 40 is of paramount importance in maintaining the liquid phase of the carbon dioxide just prior to injection.

Carbon dioxide typically becomes supercritical in the final 25% to 35% of the injector length before entering the melt stream. At this point, the back pressure within the extruder should be between about 1700 psi and 2000 psi, in order to maintain cell size of the final product between about 0.02 mm and 0.3 mm, with a cell density ranging between about 25,000,000 $cells/cm^3$ and 500,000 $cells/cm^3$.

The third stage of the extruder is designed for pumping and cooling of the polymer melt. The screw in this last stage is basically constructed for advancing the product through the system. Preferably, cross cuts are formed in the forwarding blades, oriented in such a manner as to force the polymer melt from the lower areas within the melt pool at the root of the screw into contact with the inner barrel wall, where a liquid cooling medium is circulated through a shell encompassing the entire circumference of said barrel. This last stage must also maintain the pressure required (1700 psi to 2000 psi. at 104° C.) in order for the carbon dioxide to be maintained in its supercritical phase and remain solubilized within the polymer melt.

Figure 3:
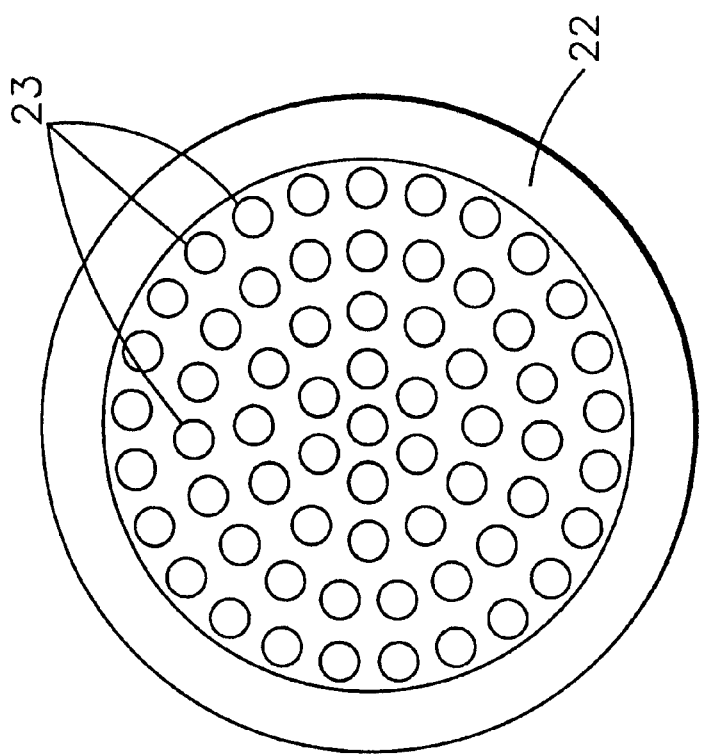
FIG. 3 is a top plan view of the extrusion die of FIG. 2.
Figure 2:
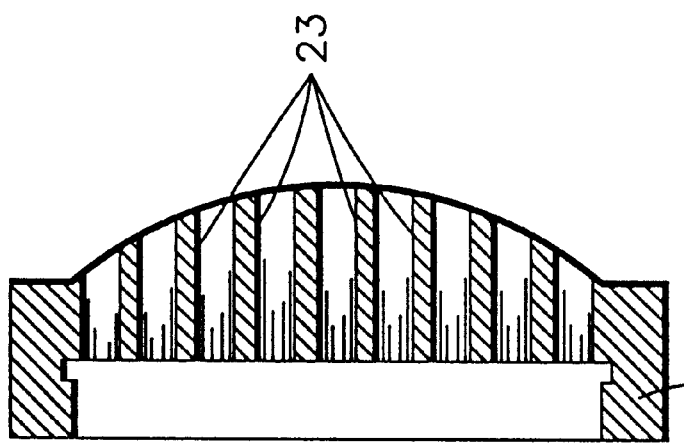
FIG. 2 is an enlarged cross-sectional side elevational view of the extrusion die employed in the extrusion device of the present invention.

The gas laden polymer melt with its combination of polymer blends, nucleators, chemical blowing agents, and color concentrates now must pass through a linear flow extrusion device 22 shown in FIGS. 1–3. By the nature of its design, taking into account polymer flow characteristics, the linear flow extrusion device 22 directs the polymer flow into multiple flow channels separating out portions of mottled polymer 25, causing a unique random streaking effect. After passing through the die and associated adapters, and manipulated downstream, the random streaking effect provides the desired aesthetic quality.

In the preferred construction, the linear flow extrusion device 22 has a dual function by serving as a back pressure promoter and maintaining a specific pressure through rheological calculations which give a specific hole size in the device versus a known throughput of polymer.

In accordance with the present invention, the extrudate from the extruder may be processed using a variety of alternate constructions. As provided herein, two alternate, unique and highly desirable processing systems are detailed. Although these alternate constructions are defined in connection with the manufacture of synthetic closures for liquid bearing containers, such as wine bottles, both processes defined herein can be employed for numerous alternate products. Consequently, this disclosure is provided for exemplary purposes and not as a limitation of the present invention.

In the preferred method, as shown in FIGS. 8–14, the extrudate is conveyed away from the exit portal or the die head of the extruder, which may be a conventional foaming die in the case of a total cellular product or a co-extrusion tool in the case of a composite structure, directly into "continuous motion casting apparatus" 60. As depicted, continuous motion casting apparatus 60 comprises two separate and independent continuous loops 61 and 62, each of which comprise a plurality of interconnected polymer casting forms 63 and 64. In the preferred construction, loop 61 comprises a plurality of polymer casting forms 63, each of which are identical to each other and are interconnected on opposed sides to adjacent casting forms 63, thereby forming continuous closed loop 61.

Similarly, loop 62 comprises a plurality of polymer casting forms 64 which are identical to each other and are interconnected on both sides thereof to adjacent casting forms 64 to form continuous closed loop 62. In addition, each casting form 64 is a mirror image of casting form 63 and is constructed for cooperative mating engagement with casting form 63 to define a forming zone therewith in which the desired product is controllably produced.

Figure 12:
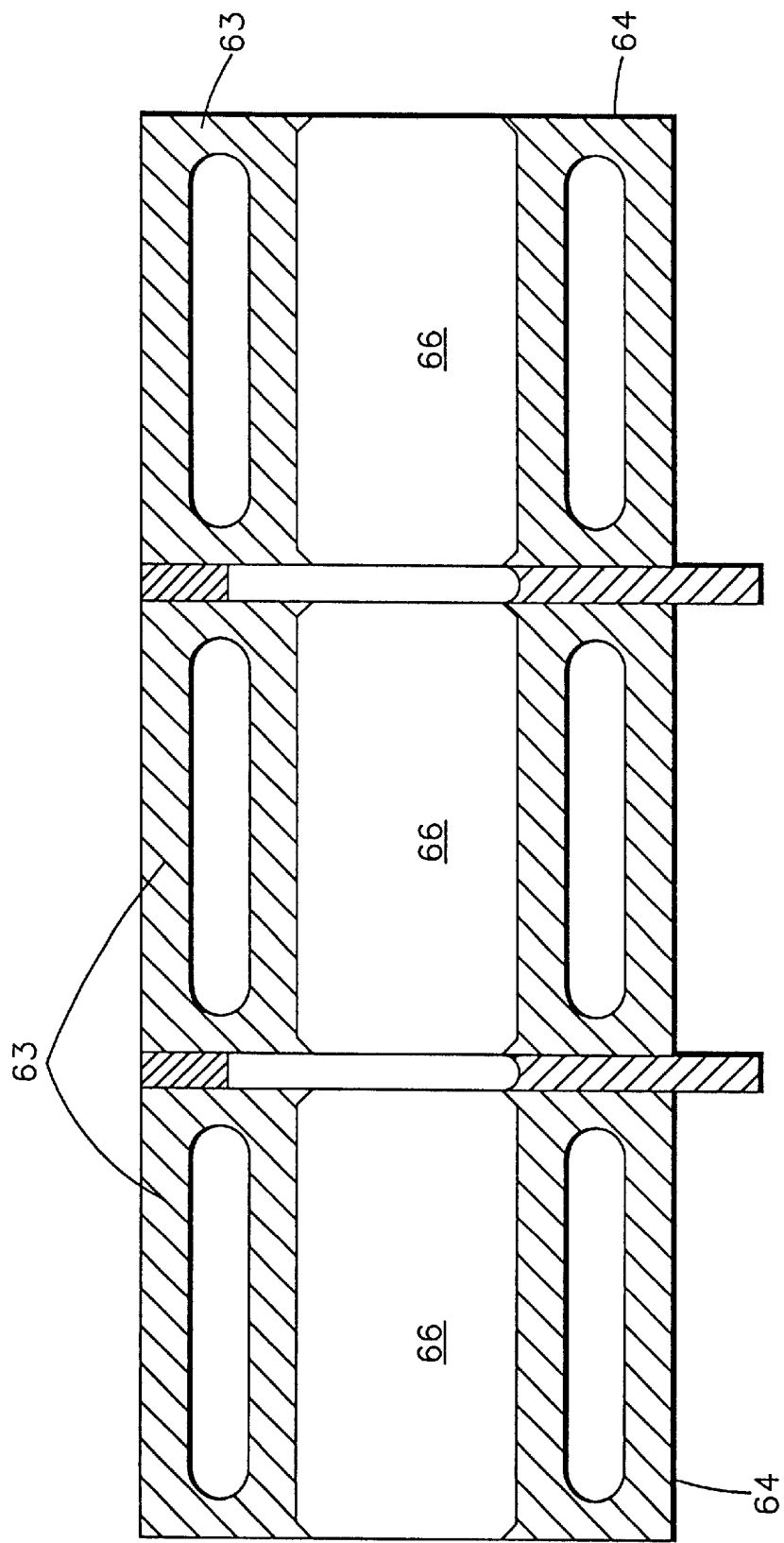
FIG. 12 is a cross-sectional plan view of a plurality of polymer casting forms of the continuous casting system of FIG. 8 depicted in mating, cooperating engagement with each other.
Figure 14:
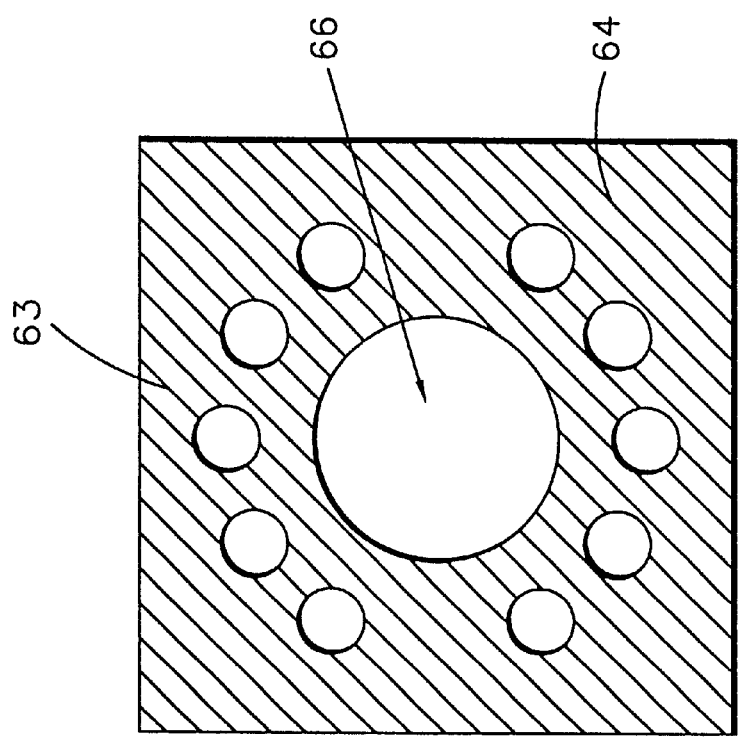
FIG. 14 is a cross-sectional side view of the mating polymer casting forms of FIG. 13.
Figure 13:
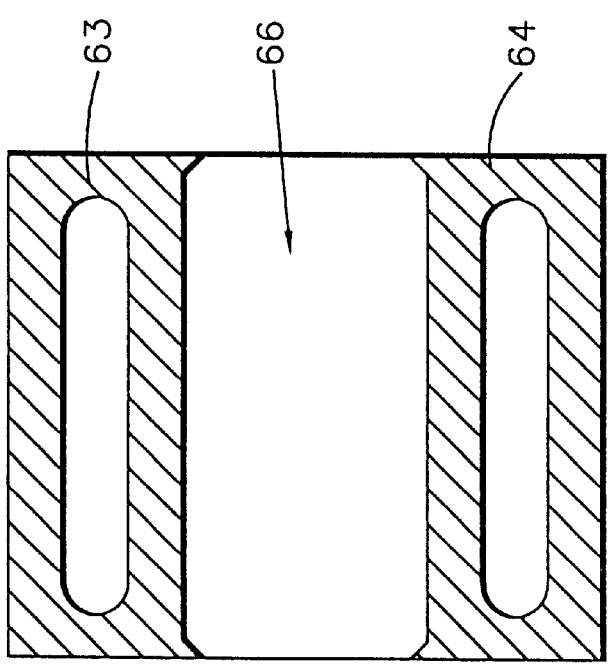
FIG. 13 is a cross-sectional plan view of polymer casting forms depicted in mating engagement.

In the preferred construction, each loop 61 and 62 continuously revolve about two capstans, spaced about ten feet. In addition, loops 61 and 62 are positioned in juxtaposed, spaced, cooperating relationship, assuring that each polymer casting form 63 precisely matches and cooperatingly engages with one polymer casting form 64 to establish therebetween a product forming zone 66, as shown in FIGS. 12, 13, and 14.

In the preferred construction, polymer casting forms 63 and 64 engage with each other in cooperating relationship with the exit portal or die head in order to receive the foamed polymer extrudate directly in cavity 66. Thereafter, the casting forms remain engaged for the desired travel distance, and are separated, when desired, to produce the fully formed product. Once separated, each polymer casting form 63 and 64 continues to rotate in their respective closed loops 61 and 62, until returning to the original position for another cycle.

Each set of casting forms 63 and 64 removes from the die lips the appropriate amount of extrudate on each retrieval. The shape defined by zone 66 in the casting form 63 and 64 will, when pressurized by the expansion of the foaming extrudate, yield the formation of a fine cell elastomeric closure suitable for the stoppering of a wine bottle or other liquid bearing product. Preferably, casting forms 63 and 64 are machined and maintained in alignment so that even with the pressure exerted by the expansion of the foam extrudate, no parting line can be detected.

In the preferred construction, forms 63 and 64 are machined to include a chamfer on both ends of the closure. In addition, a unique series of parting or cutting tools are incorporated between each adjacent assembly of casting forms and are constructed to cut or separate adjacent closures in order to yield a perfectly sized synthetic closure.

This desired result is preferably accomplished by advancing the parting tools into association with cam means which moves the tool through the extrudate, leaving within casting form 63 and 64 and extruded fine cell elastomeric closure. By employing this construction, the discharge end of continuous motion casting apparatus 60 produces the finished closure in a continuous, mass-produced operation, with each product being separated during the cutting operation and expelled by the opening of casting forms 63 and 64.

In the preferred construction, casting forms 63 and 64 are cored for the circulation of heat transfer fluids which, when utilized as a cooling medium for the fine cell elastomeric foam will form a high density layer of elastomeric foam. In this way, when desired, an outer peripheral layer is effectively created on the surface of the resulting product. By creating a higher density outer layer or surface, a synthetic closure is produced with resists the creasing effect of the corking machine jaws.

In an alternate construction, casting forms 63 and 64 may be constructed for interconnection with a vacuum source. In this regard, a vacuum can be applied through the use of minute machined orifices or through the use of pores found in sintered metals which could be utilized as the material of construction for casting forms 63 and 64. The application of vacuum further amplifies the intimate contact between the extrudate and the casting forms to ensure equal cooling around the periphery of the closure. This process ensures that the resulting synthetic closure comprises the precisely desired cylindrical shape and dimensions.

Furthermore, if desired, casting forms 63 and 64 may comprise material of construction which is textured by way of an etching process, creating minute peaks and valleys on the surface in contact with the extrudate. This leads to a significant increase in the retention of surface treatments, such as silicone, parrafins, etc., while also imparting a more natural feel to the closure, such as a rough texture, as opposed to a smooth texture, which is extremely desirable in enhancing the uniqueness of the product and process.

Figure 4:
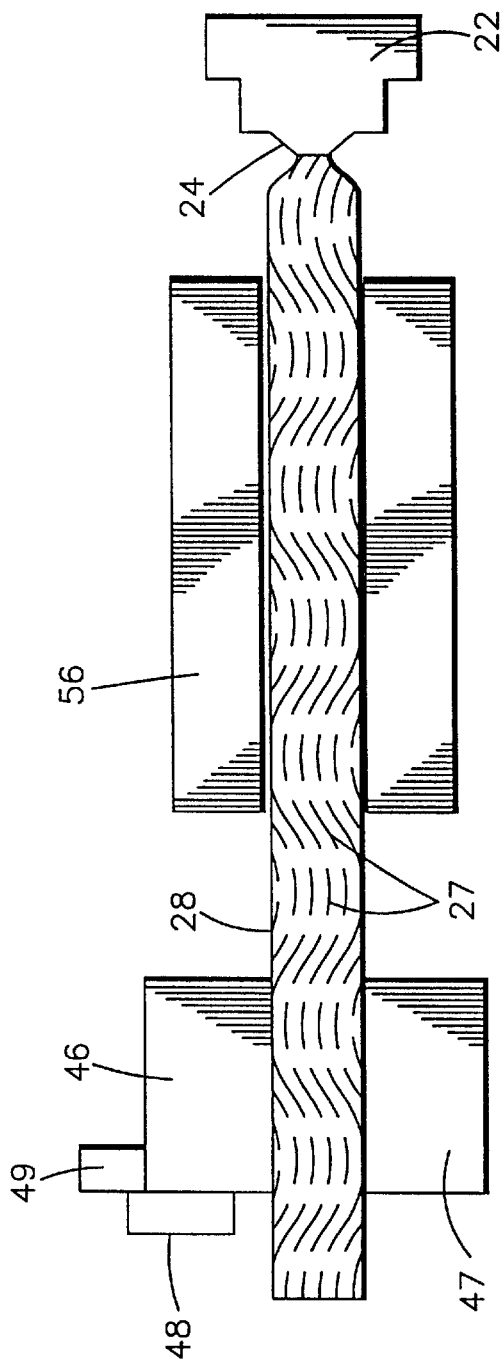
FIG. 4 is a diagrammatic side view depicting the extruded foam product of the present invention exiting the extrusion die for cooling and arcuate pivoting movement.
Figure 5:
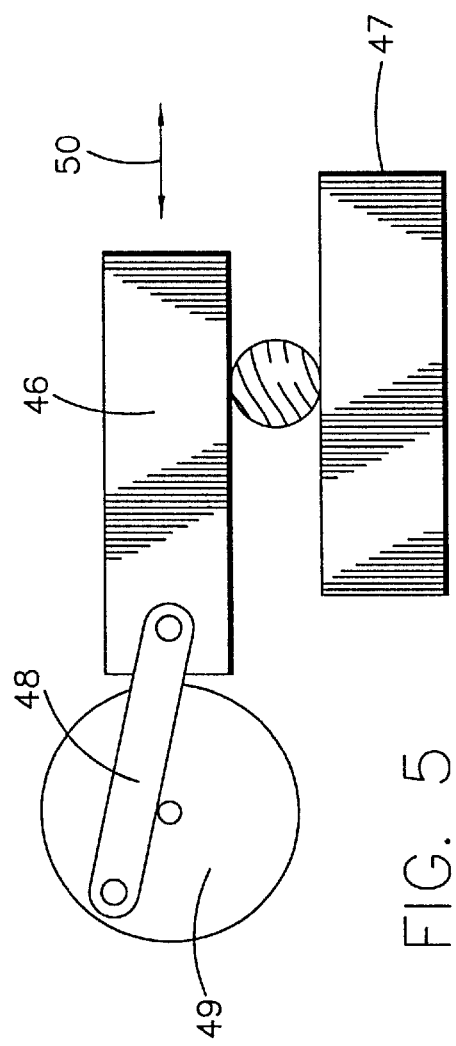
FIG. 5 is an end view of the pivot inducing systems employed and shown in FIG. 4.

In an alternate method, depicted in FIGS. 4 and 5, the extrudate is conveyed away from die 24 by way of a shaped or radiused belt conveyor (not shown) which moves extruder, 28 which is formed as an elongated continuous foamed rod, trough a regulated cooling tunnel 45. Tunnel 45 is maintained at a temperature of about 22° C., while regulating the speed of the product independently of the final speed, in order to accommodate the shrinkage factor of the foam as it cools and crystallizes. In order to hasten the extrudate cooling process, a water bath is employed by forced ambient air and then another water bath continuously used in succession. This method is particularly useful in cooling medium to high density foams (100 to 500 kg/m$^3$) since such foams are extremely good insulators. It has been found that cooling the extrudate rapidly, followed by allowing heat internal to the foam to make its way to the surface during the forced ambient air phase, and then repeating to the rapid water cooling provides a substantially more efficient system then conventional water cooling only.

In order to enhance the visual effect provided by incorporating color concentrates 25 to produce elongated colored strips or streaks 27, as detailed above, this embodiment of the present invention incorporates at least one pivot inducing plate 46, cooperatively associated with support plate 47.

In the construction depicted in FIGS. 4 and 5, pivot inducing plate 46 is connected by linking arm 48 to rotating disc 49. As a result of this construction, the continuous rotation of disc 49 causes plate 46 to continuously move in a side to side or back and forth manner in a horizontal plane, as represented by arrow 50.

By advancing extrudate or elongated foamed rod 28 along support plate 48, with movable plate 47 in controlling contact or engagement therewith, the side to side movement of plate 46 causes extrudate/rod 28 to arcuately pivot along its central axis. This rolling, arcuate motion causes the generally continuous horizontal streaks 27 formed in due 24 to be formed into arcuately curved, sinusoidal patterns 27.

By creating curved or sinusoidal shaped streaks 27 in extrudate/rod 28, the finally produced, synthetic closure incorporates growth rings which closely emulate or simulate the growth rings commonly found in natural cork products. As a result, the synthetic closure of the present invention is further enhanced and improved.

In the next step, the extrudate 28 is forwarded by means of a shaped, belted, pulling device known to those skilled in the art In the present invention, however, the pulling requires a precisely controlled speed, which works in conjunction with a non-contact method of measurement and control. This construction is required in order to provide quality assurance and dimensional stability, since the product diameter and roundness must be maintained within + or –0.15 mm. These tight tolerances are absolutely essential in order to predict and control extraction force and insertion level. In addition, extraction/insertion treatment may be provided to assure optimum results.

An extremely precise cutter capable of achieving length control in the order of + or –0.2 mm (0.008") at line speeds approaching 2400 ft./hr is also essential. These tolerances must be maintained, since variations in length can affect head space within the bottle, which has a direct correlation to movement of the closure out of the bottle and potential pressure build up as wine changed density and/or volume with temperature. In addition, length variations may also give the appearance of a low filled bottle and, therefore, would be viewed as a negative by the consumer.

Secondary Processes

After the primary phase is completed, several additional steps may be required in order to impart desirable physical characteristics to the product which will be of assistance when used in high speed corking systems commonly found in the cork industry. One such step is the chamfering of the ends of the closure. If the bottling equipment being employed is older or does not receive the maintenance required to sustain the equipment in an excellent condition, a chamfered end is desirable. In addition chamfering may be desirable from a purely aesthetic point of view, as this operation provides the closure with a finished visual appearance.

If chamfered ends are desired, the formulation employed for the closure must be capable of being cut or ground on both ends with customized equipment. Generally, the chamfer comprises a width of between about 0.5 to 1 mm, and is cut on an angle of about 45°. However, if desired, a customized chamfer may also be produced.

Treatment

Traditionally, natural corks have been treated with substances that are intended to increase or decrease the co-efficient of friction of the closure. As is well known, the closure must have the ability of being inserted into the bottle with minimal force requirements being imposed on the equipment. In this way, the life of the equipment is increased and the amount of maintenance required on the bottling lines is decreased.

In addition, the closure must remain securely retained within the neck of the bottle until such time as the wine is opened. To accomplish this goal with a synthetic closure, the elastomeric foam must have the ability to retain the additives or substances employed by the industry for this purpose and must be able to use existing equipment and technology for the application of these treatments.

Typically, the substances employed are paraffinic in nature to increase the coefficient of friction and silicone based oils to decrease the coefficient of friction for the reasons stated above. It is possible, however, to incorporate these substances and use a pressure gradient principle as well as to allow for the "blooming" of these substances out of the polymers used to create the elastomeric foam and onto the surface. Because of the many bottle types and the varying types of corking apparatus used in the industry, custom formulations with specific amounts of these substances generally require the application to be accomplished through the use of existing equipment and technology.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said if all therebetween.

What we claim as new and desire to secure by Letters Patent is:

1. A stopper or closure for a fluid product retaining container constructed for being inserted and securely retained in a portal forming neck of the container, said stopper/closure comprising:

A. an elongated, solid, cylindrically shaped member dimensioned for insertion in the portal of the neck of the fluid product retaining container for closing and sealing the fluid product in the container;

B. said member being formed from extruded foamed plastic material comprising a density ranging between about 100 kg/m$^3$ to 500 kg/m$^3$ and constructed for sealing the fluid product retained in the container and preventing transfer of the fluid product from the container prior to removal; and C. said foamed plastic material comprises a blend of at least formed two components, each comprising different hues or colors, thereby imparting an integrally formed streaking effect to said synthetic closure;

whereby a synthetic closure is attained which is capable of completely sealing any desired fluid product in a container, retaining the product in the container for any desired length of time without any degradation of the fluid product or degradation of the closure, while providing a visual appearance substantially identical to a stopper formed from natural material.

2. The synthetic closure/stopper defined in claim 1, wherein the cylindrically shaped member is further defined as comprising substantially flat terminating surfaces forming the opposed ends of said cylindrically shaped member.

3. The synthetic closure/stopper defined in claim 1, wherein the plastic material forming the core member is further defined as comprising medium density or low density, closed cell, foamed plastic comprising one or more polymers selected from the group consisting of plastic polymers, inert polymers, homopolymers, copolymers, terpolymers, thermoplastic elastomers, and thermoplastic olefins.

4. The synthetic closure/stopper defined in claim 3, wherein said closed cell foam plastic material is further defined as comprising at least one polymer selected from the group consisting of polyethylenes, metallocene catalyst polyethylenes, polybutanes, polybutylenes, polyurethanes, silicones, vinyl-based resins, polyesters, ethylenic acrylic copolymers, ethylene-vinyl-acetate copolymers, ethylene-methyl-acrylate copolymers, ethylene-butyl-acrylate copolymers, ethylene-propylene-rubber, styrene butadiene rubber, ethylene-ethyl-acrylic copolymers, ionomers, polypropylenes, copolymers of polypropylene, copolymerizable ethylenically unsaturated comonomers, and thermoplastic amides.

5. The synthetic closure/stopper defined in claim 3, wherein said closed cell, foamed plastic material is further defined as comprising one or more polyethylenes selected from the group consisting of high density, medium density, low density, linear low density, ultra high density, and medium low density.

6. The synthetic closure/stopper defined in claim 5, wherein said member further comprises a density ranging between about 200 kg/m$^3$ to 350 kg/m$^3$.

7. The synthetic closure/stopper defined in claim 1, wherein said member is further defined as comprising
   a. between about 10% and 60% by weight based upon the weight of the entire member of at least one homopolymer,
   b. between about 10% and 60% by weight based upon the weight of the entire member of at least one thermoplastic elastomer, and
   c. between about 10% and 60% by weight based upon the weight of the entire member of at least one ionically cross-linked resin.

8. The synthetic closure/stopper defined in claim 7, wherein said core member is further defined as comprising cell size ranging between about 0.02 mm and 0.5 mm and a cell density ranging between about 8,000,000 cells/cm$^3$ to 25,000,000 cells/cm$^3$.

9. The synthetic closure/stopper defined in claim 1 wherein said member is further defined as being formed by extrusion.

10. The synthetic closure/stopper defined in claim 9, wherein said extrusion process is further defined as incorporating one or more blowing agents selected from the group consisting of carbon dioxide, nitrogen, carbon, water, air nitrogen, helium, argon, Azodicarbonamic Azodiisobutyro-Nitride, Benzenesulfonhydrazide, 4,4-Oxybenzene Sulfonylsemicarbazide, p-Toluene Sulfonylsemi-carbazide, Barium Azodicarboxlyate, N,N'-Dimethyl-N,N'-Dinitrosoterephthalamide, Trihydrazinotriazine, Aliphatic Hydrocarbons having 1–9 carbon atoms, Halogenated Aliphatic Hydrocarbons having 1–9 carbon atoms, Aliphatic alcohols having 1–3 carbon atoms partially Hydrogenated Chlorocarbon and Chlorofluorocarbons.

11. The synthetic closure/stopper defined in claim 10, wherein said blowing agent is further defined as comprising between about 0.005% and 10% by weight of the weight of the plastic material and comprises an inert blowing agent selected from the group consisting of nitrogen, carbon dioxide, water, air, nitrogen, helium, and argon.

12. The synthetic closure/stopper defined in claim 9, wherein a nucleating agent is employed in the extrusion process and said nucleating agent is selected from the group consisting of calcium silicate, talc, clay, titanium oxide, silica, barium sulfate, diamatious earth, and mixtures of citric acid and sodium bicarbonate.

13. The synthetic closure/stopper defined in claim 12, wherein said nucleating agent is further defined as comprising between about 1% and 10% by weight based upon the weight of the entire composition.

14. The synthetic closure/stopper defined in claim 1, wherein the outer surface of the member is further defined as comprising indicia formed thereon.

15. The synthetic closure/stopper defined in claim 14, wherein said indicia comprises one or more selected from the group consisting of letters, symbols, colors, graphics, and wood tones.

16. The synthetic closure/stopper defined in claim 1, wherein said foamed plastic material comprises at least a first component having first hue and a second component having a second, different hue, and each of said components having different viscosities and different melt flow indicies.

17. The synthetic closure/stopper defined in claim 16, wherein the melt flow index of the first component ranges between about 6 and 10, and the melt flow index of the second component ranges between about 16 and 20.

* * * * *